United States Patent [19]

Talbot

[11] Patent Number: 4,793,623
[45] Date of Patent: Dec. 27, 1988

[54] LOAD GRIPPING HAND CART

[76] Inventor: Charles Talbot, Rte. 1, Box 1456, Prosser, Wash. 99350

[21] Appl. No.: 927,333

[22] Filed: Nov. 4, 1986

[51] Int. Cl.⁴ ............................................. B62B 1/14
[52] U.S. Cl. .............................. 280/47.24; 280/47.27; 414/450; 414/490
[58] Field of Search ............... 280/47.13 R, 47.17, 280/47.18, 47.19, 47.24, 47.26, 47.27, 47.34; 414/490, 450, 457

[56] References Cited

U.S. PATENT DOCUMENTS

| | | | |
|---|---|---|---|
| 270,068 | 1/1883 | Holman | 414/450 |
| 920,826 | 5/1909 | Copeland | 414/450 |
| 1,255,070 | 1/1918 | Waller | 280/47.23 |
| 2,278,950 | 4/1942 | Smart | 414/450 |
| 2,510,676 | 1/1947 | Biek | 414/450 |
| 3,084,820 | 4/1963 | Malo | 414/450 |
| 4,073,532 | 2/1978 | Blair | 414/24.5 |
| 4,174,849 | 11/1979 | Wetzel | 280/47.30 |
| 4,257,729 | 3/1981 | Morrissette | 414/490 |
| 4,424,999 | 1/1984 | Commins | 280/47.26 |

Primary Examiner—David M. Mitchell
Assistant Examiner—Richard Lamb
Attorney, Agent, or Firm—Wells, St. John & Roberts

[57] ABSTRACT

A load gripping hand cart includes a wheel supported frame with a projectionless load abutment surface that can be positioned adjacent to one side of an elongated load. Arms are selectively pivoted on the frame by a manually operated actuator mechanism to converge against sides of the load and secure it to the load abutment surface. The actuator mechanism includes self-locking features that facilitate locking of the arms against the load in a closed orientation. The actuator mechanism is situated separate from the handle end of the cart frame so the load can be secured to the cart frame and so the arms can be locked in an operation separate and independent from the lifting and transport operation which is controlled from the handle end of the frame.

21 Claims, 3 Drawing Sheets

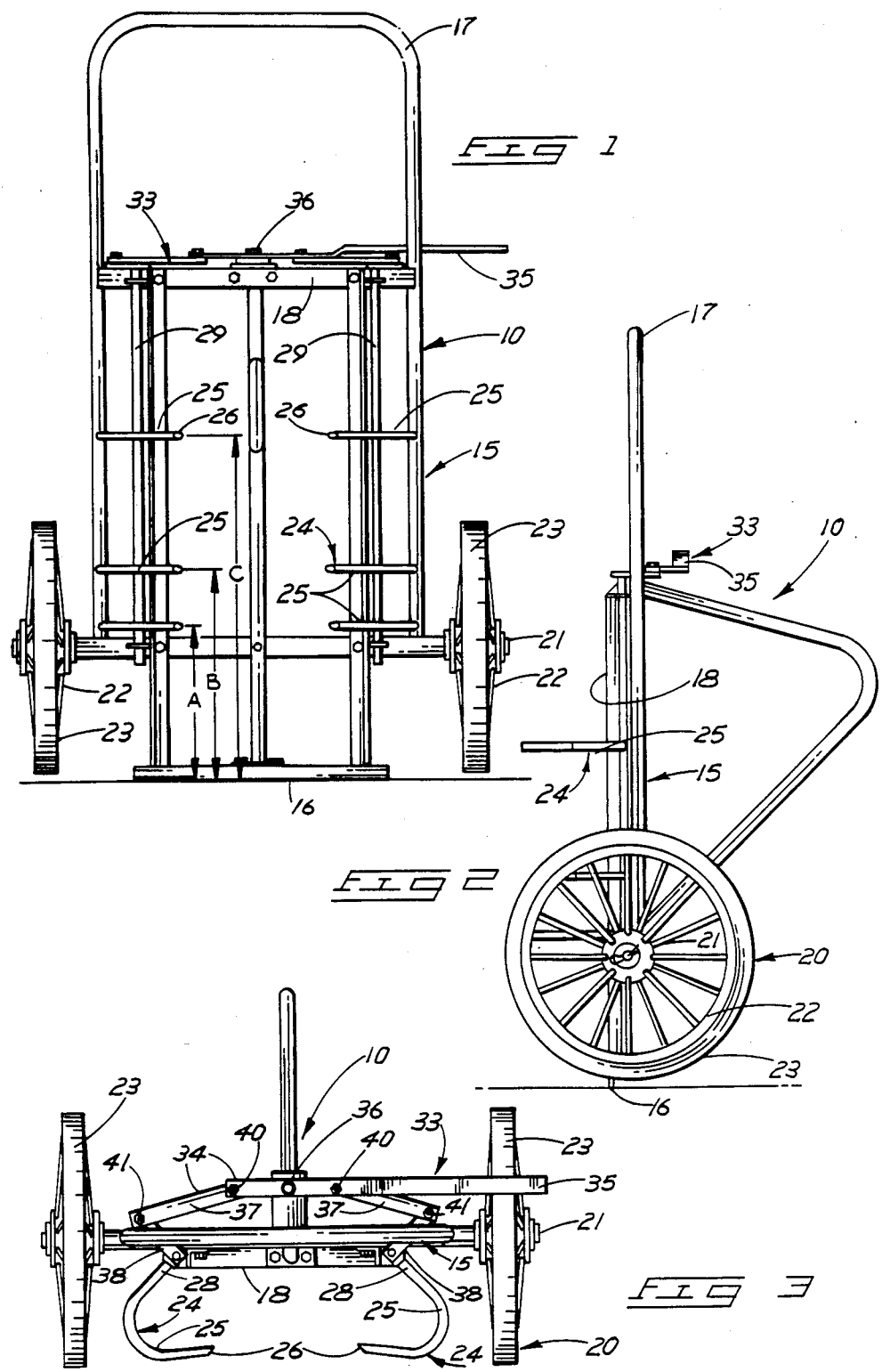

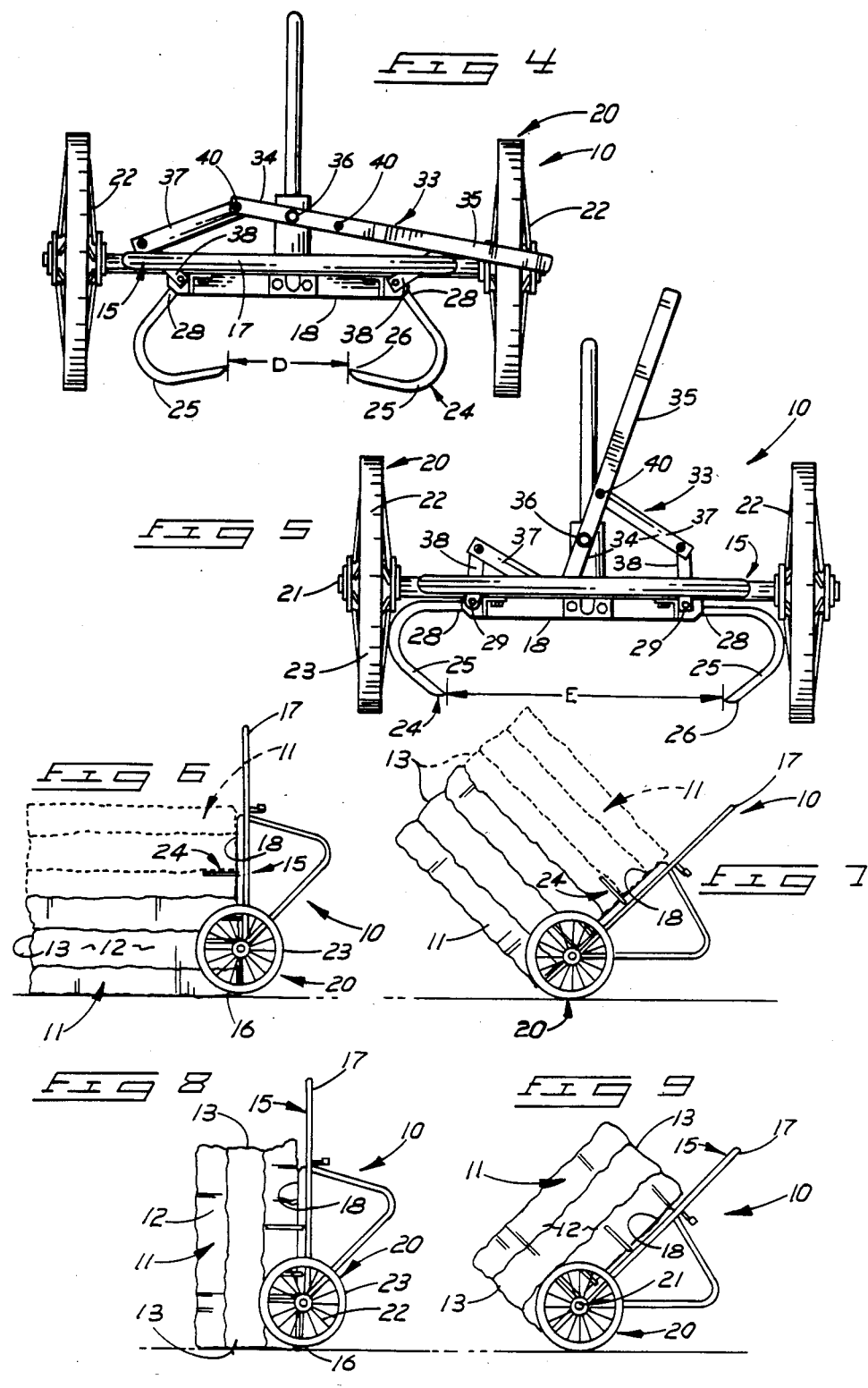

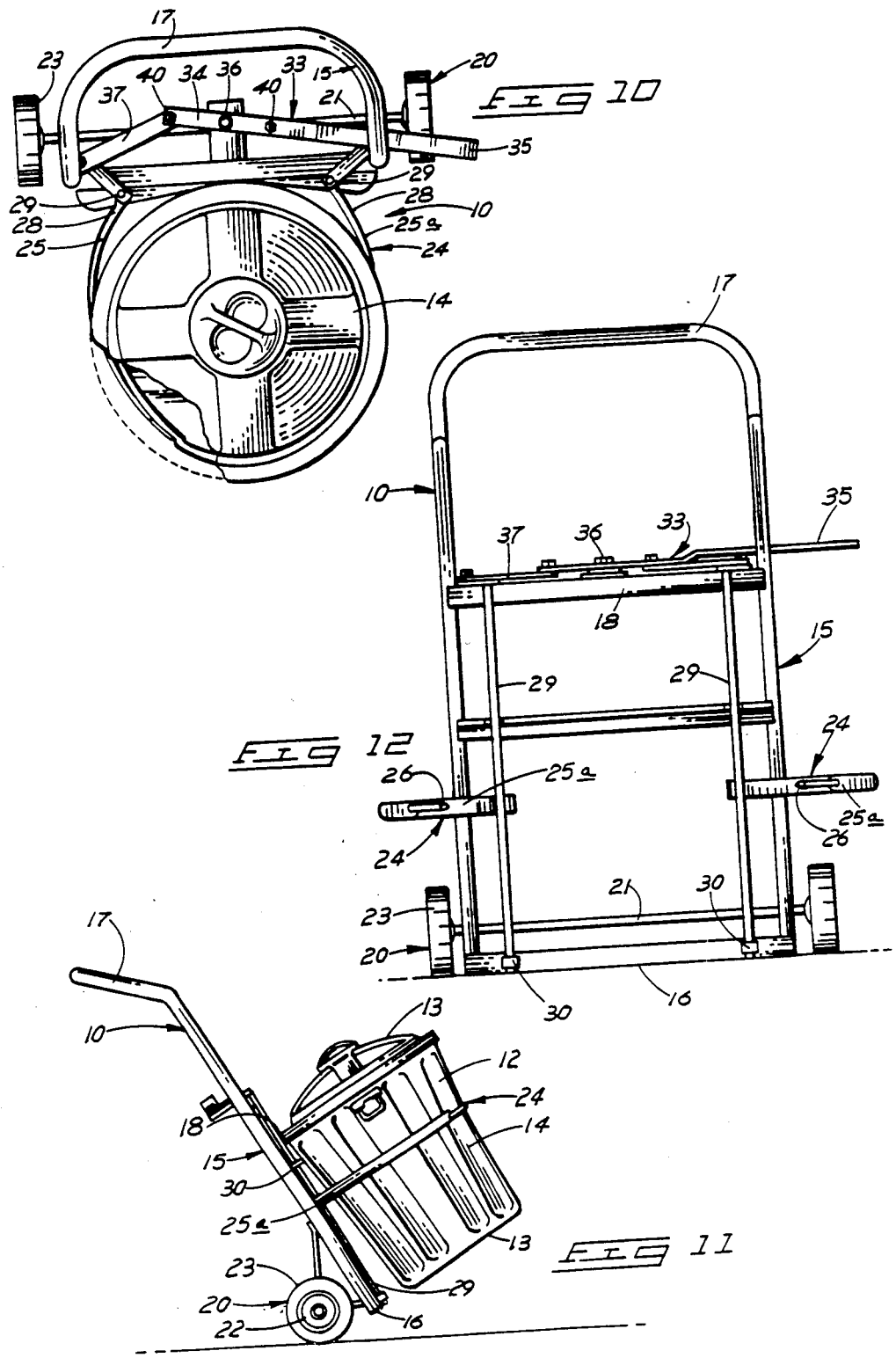

4,793,623

LOAD GRIPPING HAND CART

TECHNICAL FIELD

The present invention is related to securing, lifting and transporting a load by way of a manually operable hand cart.

BACKGROUND OF THE INVENTION

Hand carts and "dollies" have been used for centuries in lifting and movably supporting heavy loads. The typical hand cart includes a rigid upright frame, having a handle at a top end and a pair of ground engaging wheels at a bottom end. A forwardly projecting ledge is usually provided at the bottom end of the frame for supporting the weight of the load adjacent the wheels. The load is supported on this ledge and the engaged portions of the cart frame. The wheel axis acts as a fulcrum point about which the load is tipped as the cart frame is inclined to lift the load. The wheels can then be used for transporting the load once the frame has been tipped far enough to lever the load upwardly from the ground surface.

The above standard cart form functions entirely serviceably where there is relatively free access to the underside of the load. Such access is required for proper placement of the forwardly projecting ledge under the load for lifting and transport. There are many objects that do not easily lend themselves to transport by such hand carts since there is no easy access underneath the load for the forwardly projecting cart edge.

Another common problem with typical hand carts is securing the load once it is in place upon the cart framework. A solution to this problem is disclosed in U.S. Pat. No. 2,510,676 to Biek. This patent discloses a hand cart of the typical form but including load engaging and gripping arms that extend from the cart frame. The arms are selectively pivoted by the cart frame handles. The operator must rotate both handles selectively to pivot the load engaging arms into and away from contact with the load. The operator can selectively maintain a gripping, stabilizing force on the load, or can selectively release the arms by rotating the handles appropriately. Two hands are required to perform this function and both must remain occupied on the handles so long as the gripping forces are required. Additionally, the arms are used only to stabilize the load as opposed to providing support. Support is provided by a forwardly projecting ledge at the bottom end of the cart frame, a feature typical of such hand carts as generally described above.

Certain forms of loads require special considerations, such as those indicated above where access beneath the load is limited. Other needs also come into consideration. For example, hay bales are unwiedly due to their fairly large size and weight. Most bales are typically tied with wire or string and are shaped in the form of a rectangular solid. The string or wire is wound in two individual loops about the long dimension of the bale. Handling techniques for such bales usually involve simple manual manipulation by hand wherein the strings are grasped and the bale is lifted by the strings, or by "hay hooks". While tractor mounted mechanical lifts have been developed for large, cylindrical bales (U.S. Pat. No. 4,073,532 to Blair), other methods for easing manual handling of the more common smaller rectangular bales has been limited.

One attempt at manual mechanization of bale handling is demonstrated in U.S. Pat. No. 4,174,849 to Wetzel. The apparatus described in this patent includes a wheelbarrow frame configuration with carrying members situated between a bottom single wheel and handles at an opposite end of an elongated frame. Bale engaging hooks are positioned on the frame with one stationary set position adjacent the wheel and one pivoted set situated adjacent the handle ends of the frame. The frame, hooks and wheel are constructed so the cart must be placed over a bale, with the operator situated on one side of the bale and the frame and wheel extending to an opposite side of the bale. The cart can then be pulled rearwardly to pull the stationary set of hooks into the adjacent bale end. The pivoted tines can then be swung downwardly into the opposite end of the bale to secure it in position in relation to the frame. The bale can then be lifted and transported while suspended from the hooks under the frame. The forward hooks are pivoted about an axis that is transverse to the longitudinal dimension of the frame and are swung manually into position. No provision is made for locking the hooks in a closed, operative position. Additionally, the hooks are positioned along the frame so that the bale must be engaged at opposite end surfaces. This arrangement therefore allows only a single bale to be engaged at a given time and allows for only a single length bale to be carried. This presents a problem since bales may vary in length dimensions.

The Blair patent briefly mentioned above deals with a handling device mounted to a tractor for lifting and handling large round bales. The device makes use of a hydraulically operated set of bale engaging tines mounted for partial rotation responsive to action of a hydraulic cylinder on a rigid frame. This frame is carried at the outward end of hydraulically pivoted arms mounted to the tractor. The tines spread to receive a portion of the round bale circumference. A considerable number of tines are provided to engage the bale circumference in order that the bale can be supported by the tines when the arm is lifted.

U.S. Pat. No. 1,255,070 to Waller and U.S. Pat. No. 2,278,950 to Smart both disclose hand carts or trucks with spring biased, normally closed gripping arms for engaging and releasably securing a load. The gripping arrangements are provided at a position angularly disposed from the cart frames. The angular relation between the frames and arms is such that an operator is required to push the frame handles downwardly to produce a lifting force at the load. While serviceable, these carts are large and substantially awkward to handle. They are also quite complex in construction.

U.S. Pat. No. 270,068 to Holman discloses another form of hand truck somewhat similar to the Waller and Smart trucks discussed above. The Holman truck includes forwardly projecting arched jaws that are normally sprung open to receive a load. The jaws are pivoted on pins with rearwardly extending lever arms leading to a cam operator. The cam operator is situated at the end of a long lever handle. The handle is pivoted to the frame for movement responsive to manual shifting of the lever from one side of the frame to another. Movement of the cam causes the lever arms to move the load gripping surfaces together or apart. A catch arrangement is provided adjacent an outward end of the handle for selectively securing the handle in a selected position. The catch prevents the gripping members from pivoting toward on open position but does not prevent them from swinging further closed. No positive locking capability is provided. Deformation of the load could therefore result in release of the gripping members and consequent disengagement of the cart and load. This is a very real possibility with loads, such as hay bales, that are capable of deformation. This also presents a problem where the gripping members penetrate the load. The handle can not be used to open the tines and release the load. There is no provision beyond the springs for accomplishing this function.

A problem has therefore remained in providing releasable, yet secure, load gripping members in a hand cart, along with features that eliminate the need for a forwardly projecting foot at the bottom end of the cart as has been needed to receive and support an engaged load. The present invention, as will be understood below, provides a new and unobvious solution to this problem.

BRIEF DESCRIPTION OF THE DRAWINGS

Preferred forms of the present invention are illustrated in the accompanying drawings, in which:

FIG. 1 is a front elevation view of a first preferred form of the present cart;

FIG. 2 is a side elevation view of the first preferred form;

FIG. 3 is a top plan view as seen from above in FIG. 1;

FIG. 4 is a view similar to FIG. 3 only showing the grab means of the first preferred form in a closed orientation;

FIG. 5 is a view similar to FIG. 4 only showing the grab means in a fully open condition;

FIGS. 6 and 7 are operational views illustrating use of the first preferred form engaging and lifting a load such as hay bales for transport;

FIGS. 8 and 9 illustrate use of the present invention to engage and lift a load for transport;

FIG. 10 is a plan view of a second preferred form of the present invention along with a load such as a trash can mounted thereto;

FIG. 11 is a side elevation view of the second preferred form of the invention with the frame thereof in an operational, transport condition in which the trash can is supported by the cart; and FIG. 12 is a front elevation view of the second preferred form.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

The present load gripping hand cart is generally indicated in the accompanying drawings by the reference numeral 10. There are two forms of the present cart shown in the drawings. FIGS. 1 through 9 show a form of the cart that is used for lifting and transporting loads such as hay bales 11. The second preferred form shown in FIGS. 10 through 12 is intended for use in hauling cylindrical objects such as trash cans 14.

For purposes of this description, the "load" will include objects such as the hay bales 11 or trash can 14 that includes similarly elongated sides 12 and transverse ends 13. Other similarly elongated objects will also qualify as a "load" for use in conjunction with the present invention. Special provisions, however, are made in the first form of the present invention especially for the purpose of handling baled "hay" or vegetation that has been gathered and bundled into substantially elongated rectangular bales.

Both forms of the present load gripping hand cart include similar features and such features will be referred to by like reference numerals in the following description. Distinguishable features will be separately described.

Generally, the present cart 10 basically includes a relatively rigid and elongated cart frame 15 which is movably supported by a wheel means 20. It is also provided with a grab means 24 for manual actuation to grip and release a load by operation of an actuator means 33.

More specifically, the cart frame 15 is preferably formed of an appropriately formed metal tube, channel, or angle. It includes a length dimension extending between a foot end 16 and a handle end 17. A forwardly facing load abutment surface 18 is defined along the frame 15 between ends 16 and 17. As shown, the load abutment surface is advantageously planar, substantially flat and projectionless. By "projectionless" it is meant that there is no forwardly projecting shelf or support at the foot end 16. This represents a substantial distinction over other known forms of hand carts.

The wheel means 20 is provided along the cart frame 15 between ends 16 and 17. Wheel means 20 may include an elongated transverse axle 21. The axle 21 defines a transverse wheel axis that is situated adjacent the foot end 16 with respect to the handle end 17 of the frame. A pair of wheels 22 may be situated at opposite ends of the transverse axle 21. Each wheel 22 includes an outer circumference defined by a tread 23 on prescribed radius from the wheel axle 21. The wheel radii are equal to one another but are somewhat less than the distance between the wheel axis and the foot end 16 of the cart frame. This feature is indicated in FIGS. 1, 2 and 6 where the foot end 16 is engaged and supported on the ground surface while the wheel treads 23 are suspended above the ground surface.

The wheel axis is preferably situated rearward of the load abutment surface 18. This relationship is clearly shown in FIGS. 2 and 11. A comparison of these two figures also indicates variability of the wheel diameter.

Another very important feature of the present invention is embodied in the grab means 24. The grab means 24 is comprised of at least one pair of forwardly extending grab arms 25. The arms 25 of the first preferred form as shown in FIGS. 1 through 9, include curved shanks that extend arcuately from ends 28 mounted to the cart frame 15 to pointed ends 26. The ends 28 are secured to longitudinal rods 29 that are pivotally mounted along the cart frame. The long rods 29 are journalled at 30 along the cart frame for pivotal motion such that the pointed arm ends 26 can be selectively moved toward or away from one another. Rods 29 are situated for pivotal movement along opposite longitudinal sides of the load abutment surface 18. Their pivot axes are preferably situated along the plane of the load abutment surface 18 or slightly rearward thereof. The pivot axes are parallel to one another and substantially perpendicular to the wheel axis.

In the FIG. 1 through 9 embodiment, spacing of the load gripping arms along the rods 29 is important for proper function of the device to lift and transport one or more bales. After considerable experimentation, it has been determined that a lower pair of the arms 25, one on each side of the frame, is optimal for lifting and transporting single bales. Spacing along the frame from the foot end 16 to the paired arms along the length of the frame is indicated respectively by the letters A and B in FIG. 1. These distances are advantageously 12 and 16 inches respectively. A third pair of arms are desirable along the rods 29 for securing additional loads or for securing a single load in an orientation wherein the load is positioned with its longitudinal side 12 extending along the length of the frame (FIGS. 8 and 9). Spacing of the third pair of load gripping arms is indicated in FIG. 1 by the dimension "C". It is advantageous for this dimension to be approximately 30 inches from the foot end of the cart frame. The above spacing for the load gripping arms eliminates the need for a multiplicity of load gripping members and thereby reduces the bulk, weight, and overall expense of the present apparatus.

Another important dimension for the first preferred form of the invention is the relative distances between the points 26 when in closed and open positions. It has been found advantageous to position the arms with the points 26 spaced apart by a distance less than the width of a bale or approximately 8 inches across the frame when in the closed position (as shown in FIG. 4 by the dimension "D"). It is also advantageous to arrange the arms such that the points 26 will be pivoted apart in the open condition by a distance wider than a bale, or at least 20 inches (as shown in FIG. 5 by the dimension "E"). These distances facilitate use of the present cart with a variety of standard size hay bales. The open position allows the width of the bale to be freely received between the arms and against the load abutment surface. The points in the closed position are spaced apart by distances less than the width of the bale such that the bale is penetrated by the points and is secured and supported on the arms and against the load abutment surface 18.

It is noted that the arms 25a in the second preferred form of the invention are substantially longer and more arcuate than those of the first preferred form. These arms are shaped to received and grip cylindrical objects such as the trash can 14 shown in FIGS. 10 through 12. It has been found that a single pair of arms 25a are sufficient for this purpose when located along the frame substantially as shown in the drawings. The arms 25a, in this condition, function to grip the can sides 12 and urge the can 14 against the load abutment surface 18. The arms are utilized to converge against the sides 12 of the can and hold it firmly against the load abutment surface 18. The load weight is carried by the arms and frame.

The actuator means 33 is operably connected to the grab means 24 for moving the load gripping arms between open and closed positions and for releasably locking the arms in the closed position. The actuator means 33 may include a toggle means 34 adjacent to but separate from the handle end of the cart frame. The toggle means is also situated rearward of the load abutment surface and between the long rods 29.

The toggle means 34 includes an elongated lever 35. Lever 35 is pivotally mounted to the frame 15 for pivotal motion about an axis at a pivot 36 that is parallel to the pivot axes of the rods 29 and between the two rods 29. An outward end of the lever 35 extends from the frame to provide a hand grip surface at its outward end. The length of the lever provides mechanical advantage to manual operation of the toggle linkage 34.

A pair of links 37 have ends pivotally mounted to the lever 35 at pivots 40 along the lever 35 spaced equally from the lever pivot 36. The links 37 extend laterally outward from pivots 40 to outward ends mounted at pivots 41 to crank arms 38. The crank arms 38 are rigidly secured to upward ends of the longitudinal rods 29.

The actuator means 33 is provided to selectively lock the arms 25, 25a in their closed positions. The locking capability is a function of the toggle means 24. The pivot 36 for lever 35 is situated rearward of the longitudinal sides for the cart frame. This enables the lever to be pivoted to an "overcenter" position as shown in FIG. 4 where the link pivot connection 40 toward the end of the lever is spaced rearwardly of the frame pivot 36. The pivot connections between the links and the lever in this position are such that forces tending to open the arms are translated through the crank arms 38 and links 37 to the lever 35 which is "overcenter" against the framework 15. This is similarly true of forces tending to urge the arms together. Only manual manipulation of the lever, pulling it away from the frame toward the FIG. 5 position will "unlock" the linkage and permit the arms to fully open.

The toggle linkage is substantially identical for both preferred forms of the present invention. The toggle linkage utilized in the second preferred form is connected to elongated pivot rods 29 for moving the long arcuate arms 25a together and apart. The same overcenter locking arrangement is also provided to secure the arms in their closed positions.

The lever handle and toggle mechanisms of both forms are situated downward of the handle end 17 of the cart frame. The user can therefore move the cart using one or two hands on the handle 17. Such operation is completely separate from the load gripping and securing features of the arms and toggle mechanism.

Both forms of the present invention also operate in a similar manner.

The cart frame is operated by grasping the handle 17 and tipping the cart to a position substantially as shown in FIGS. 7 and 9. The frame, in this orientation, is clear of the ground surface and the wheels enable transport of the frame either by pushing or pulling from the handle end. The cart may be easily moved to a position adjacent one side of the load to be engaged. It is then tipped upwardly to a substantially upright orientation. The foot end of the cart frame engages the ground as the cart frame is tipped upwardly. The wheels therefore become elevated above the ground surface and, for the moment, become ineffective.

This is an important consideration and is provided by the relationship of the wheel radii and the distance between the wheel axis and foot end 16 of the frame. The entire cart frame is supported at the foot end of the frame when in the upright orientation and is rigid in relation to the ground surface. There is no danger that the frame will roll backwards once the load is gripped since the frame is directly engaging the ground and the wheels are no longer supporting the weight of the cart. Dangerous "rollback" or loss of control as the weight of the cart frame shifts ahead of the wheel axis is therefore eliminated.

The user can safely shift the cart to the upright orientation or even slightly beyond the upright position and operate the toggle mechanism without fear that the load and frame will begin to roll away while he or she operates the lever to lock the arms closed against the load.

The load is secured to the cart frame by shifting the lever handle 35 from the position shown in FIG. 5 to the position shown in FIG. 4. This is done manually by grasping the handle at the outer end and pushing it forwardly until it engages one side of the cart frame. This automatically moves the toggle linkage 33 to the overcenter condition, locking the associated arms 25 or 25a in the closed, load engaging position.

As the arms pivot together, the load is engaged and through the geometry of the arms and their pivot centers at rods 29, is drawn firmly against the load abutment surface 18. Surface 18, along with the clamping forces applied through the arms, is sufficient to secure the load to the cart frame for lifting and transport. Lifting is accomplished simply by tipping the cart frame back to the angled orientation as shown in FIGS. 7, 9, and 11. This is easily done due to the mechanical advantage offered first by the foot end 16 of the cart frame acting as a fulcrum, then by the wheel axis after the wheels 20 engage the ground surface. A considerable amount of weight may thus be securely and safely lifted. Loads as heavy as two hundred pounds and more have been lifted and transported using the present device with little effort expended.

Special provisions are made in the first preferred form of the invention for handling hay bales. The specific spacing indicated above and configuration of the arms is such that one or two bales can be lifted and transported by the present cart. Furthermore, a single bale 11 can be transported using either of two orientations with the present arrangement. As shown in FIG. 6, a bale 11 can be engaged so that its end surface 13 is situated against the load abutment surface 18 of the cart frame. The handle 35 and toggle mechanism 33 can be closed to engage the bottom two pairs of arms 25 into the adjacent bale sides 12. The arms 25 penetrate the bale sides 12 and pull the end 13 firmly into engagement with the load abutment surface 18. The bale can then be lifted in the cantilevered orientation shown in FIG. 7.

The same is true for two bales stacked one on another as shown by the solid and dashed lines in FIGS. 6 and 7. In this relationship, the third pair of arms 25 are utilized to secure and grip the top bale of the stack. Only a single set of the arms 25 is required here since the primary weight of the second or top bale rests upon the first.

The cart can also be utilized to engage a bale extending lengthwise of the frame as indicated in FIG. 8. This can be done by first shifting the bale to the upright position shown in FIG. 8. Alternatively, the cart frame can be tipped over a horizontal bale (FIG. 6) such that the entire cart would be first supported across the top of the bale. The toggle lever 35 can then be operated to grip opposite bale sides 12. The entire interconnected assembly including the bale and cart frame can be tipped up to the FIG. 8 position. The user can then tip the frame rearwardly to the FIG. 9 position for transport.

A special safety provision of the present invention may be understood with reference to FIGS. 4, 5, and 10. There, the toggle linkage lever 35 is shown in outward (open) and (closed) inward positions. The lever handle 35 extends in the outward position angularly rearward of the cart frame. The angle of the lever in this position is such that the handle end will engage the ground surface and swing toward the frame, causing the arms to pivot closed if the cart frame is allowed to lay back against the ground surface. The pointed ends 26 of arms are thus moved safely inwardly toward the load abutment surface, avoiding a dangerous situation that could exist if the pointed arms were left projecting upwardly when the cart is stored in a relatively horizontal position.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A load gripping hand cart, comprising:
   an elongated cart frame extending longitudinally from a foot end to a handle end, with a forwardly facing load abutment surface between said ends;
   a ground engaging wheel rotatably mounted to the frame for rotation about a wheel axis adjacent the foot end thereof;
   load grab means on the frame including a pair of pivoted load gripping arms for movement thereon forward of the load abutment surface between an open position for loosely receiving and releasing the load and a closed position for gripping and supporting the load
   manual actuator means on the frame separate and independent from the handle end and spaced toward the foot end of the frame from the handle end, operatively connected to the load grab means for manual operation to move the load grab means between the open and closed positions, and for selectively releasably locking the load grab means in the closed position;
   wherein the actuator means is comprised of toggle means on the frame having a manually operable lever and toggle linkage connected to the arms for operation in response to manual manipulation of said lever to pivot the arms apart relative to one another to said open position and to pivot the arms toward one another to said closed position, and wherein the toggle linkage moves to an over-center, locked position as the arms are moved to said closed position.

2. The load gripping hand cart of claim 1 wherein said lever is pivotal on said frame from an angular outward position corresponding with the open position of grab means projecting substantially outward of the load abutment surface and an inward position corresponding with the closed locked position in which the lever is pivoted against the frame.

3. The load gripping hand cart of claim 1 wherein the load abutment surface is flat and is substantially parallel to the wheel axis.

4. The load gripping hand cart of claim 1 wherein the wheel includes an outer wheel circumferential surface on a radius from the wheel axis and wherein the distance along the frame the wheel axis to the foot end of the frame is greater than the radius of the wheel.

5. The load gripping hand cart of claim 1 wherein the load gripping arms are curved toward one another and pivotally mounted on the cart frame on opposite sides of the load abutment surface; the arms being pivotal on the cart frame about axes oriented longitudinally with respect to the elongated cart frame.

6. The load gripping hand cart of claim 1 wherein the load gripping arms are pivotably mounted on the cart frame about axes oriented longitudinally with respect to the elongated cart frame.

7. The load gripping hand cart of claim 6 for manually transporting an elongated load having longitudinal sides extending between opposed ends wherein three pairs of pivotable arms are mounted to the cart frame with two of said pairs adjacent the foot end of the frame for engaging opposite longitudinal sides of a load adjacent one of the load ends, and with the remaining pair of arms being situated adjacent the handle end of the frame for engaging sides of a load adjacent the remaining load end.

8. The load gripping hand cart of claim 6 wherein a pair of said arms are spaced along the cart frame across the load abutment surface and wherein the load abutment surface is formed along a plane extending along the cart frame between the arms of said pair.

9. The load gripping hand cart of claim 1 wherein the toggle means is situated on the cart frame adjacent the handle end and includes a lever movable to (a) an outward position projecting rearwardly of the cart frame opposite to the load gripping arms, the outward position corresponding to the open position and (b) an inward position against the cart frame corresponding to the closed position of the load grab means.

10. The load gripping hand cart of claim 9 wherein the wheel includes an outer wheel circumferential surface on a radius from the wheel axis and wherein the distance along the frame from the wheel axis to the foot end of the frame is greater than the radius of the wheel.

11. The load gripping hand cart of claim 1 wherein the wheel axis is rearwardly adjacent the load abutment surface and wherein the foot end of the cart frame is situated radially with respect to the wheel axis beyond the circumference of the wheel in order to engage the ground surface and support the cart with the wheel above the ground surface as the cart frame is tipped forwardly to and beyond an upright orientation.

12. The load gripping hand cart of claim 1 wherein the arms include pointed ends for penetrating the load, said arms being pivotable on opposite sides of the load abutment surface between (a) the open position wherein the arm points are spaced apart to receive a load therebetween and are angularly oriented toward one another across the load abutment surface, and (b) the closed position wherein the arm points are spaced apart to engage and penetrate a load therebetween and wherein the arms points are angularly oriented toward the load abutment surface.

13. The load gripping cart of claim 1 wherein the load gripping arms include pointed load penetrating ends, said arms being pivotably mounted to the cart frame along pivot axes on opposite longitudinal sides of the load abutment surface, said arms projecting forward of the load abutment surface and wheel axis.

14. The load gripping hand cart of claim 1 wherein the load gripping arms are pivotably mounted to the cart frame and situated thereon to grip a load along selected side surfaces thereof and simultaneously press the load against the load abutment surface.

15. The load gripping hand cart of claim 1 wherein the load gripping arms are mounted to the cart frame about parallel pivot axes, extending longitudinally along the cart frame and substantially perpendicular to the wheel axis.

16. The load gripping hand cart of claim 15 wherein the arms include pointed ends for penetrating the load and are pivotal on the cart frame about the pivot axes between (a) the open position wherein the points are spaced apart by a distance greater than the width of the load; and (b) the closed position wherein the points are spaced apart by a distance less than the load width to penetrate the load.

17. The load gripping hand cart of claim 16 wherein the wheel includes an outer wheel circumferential surface on a radius from the wheel axis and wherein the distance along the frame from the wheel axis to the foot end of the frame is greater than the radius of the wheel.

18. The load gripping hand cart of claim 1 wherein three load gripping arms are pivotably mounted on each side of the load abutment surface for actuation by said actuator means;
   wherein the three arms on each side of the load abutment surface are spaced longitudinally from the foot end of the cart by approximately 12, 16 and 30 inches respectively.

19. The load gripping hand cart of claim 1 wherein the arms include pointed ends and wherein the distance between the pointed ends when in the open position and measured transversely across the cart frame is at least 20 inches; and
   wherein the distance between the pointed ends measured transversely across the cart frame when the arms are in the closed position is approximately 8 inches.

20. The load gripping hand cart of claim 1 wherein the arms include ends and wherein the distance between the ends when in the open position and measured transversely across the cart frame is at least 20 inches.

21. The load gripping hand cart of claim 16 wherein the arms include ends and wherein the distance between the ends measured transversely across the cart frame when the arms are in the closed position is approximately 8 inches

* * * * *